Patented Feb. 3, 1948

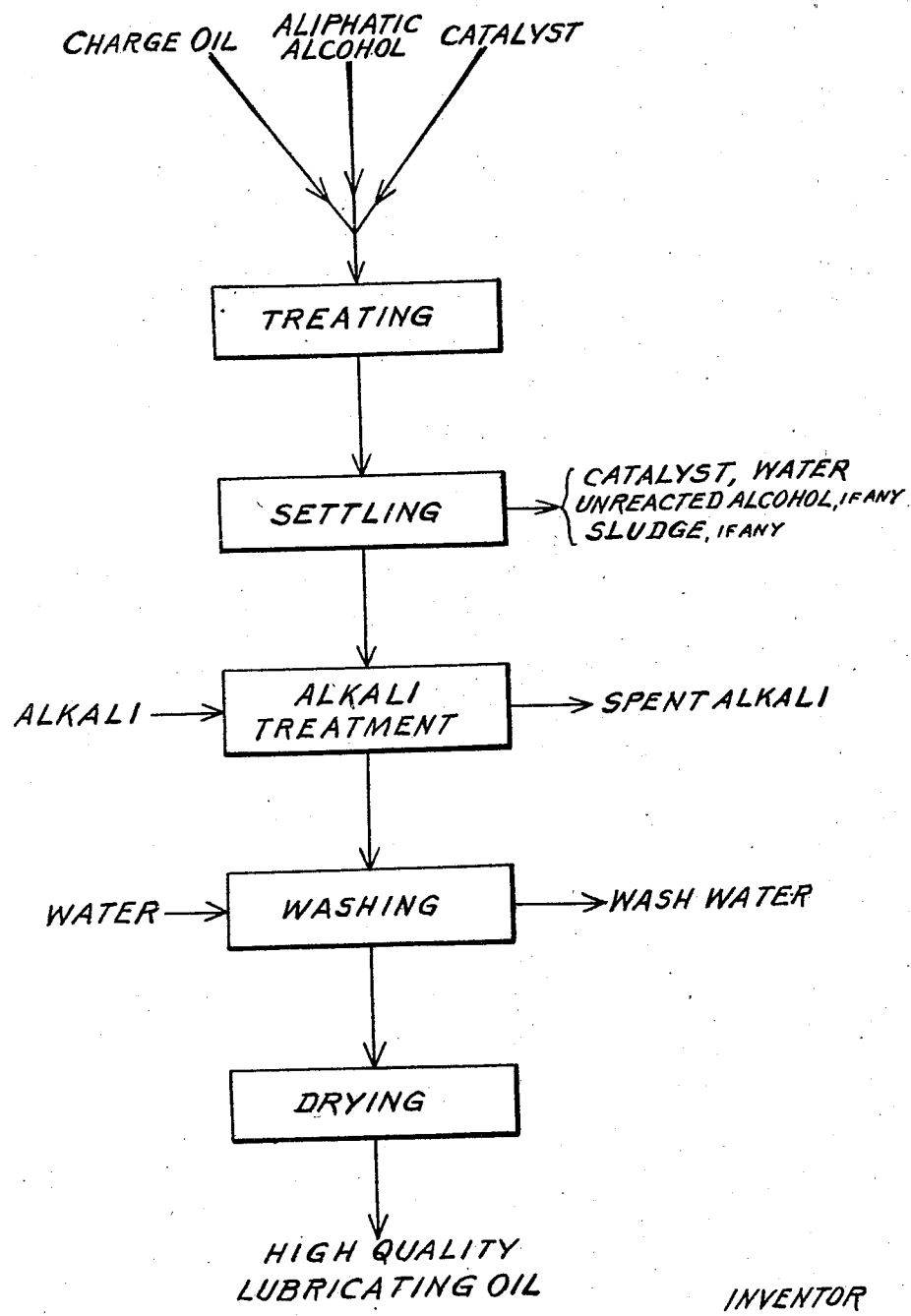

2,435,483

UNITED STATES PATENT OFFICE 2,435,483

PREPARATION OF LUBRICATING OIL

Richard S. Vose, Swarthmore, Pa., assignor to Sun Oil Company, Philadelphia, Pa., a corporation of New Jersey Application February 19, 1944, Serial No. 523,050

7 Claims. (Cl. 260—683.4)

The present invention relates to chemical reactions involving hydrocarbons and more particularly to alkylation reactions whereby hydrocarbons of lower molecular weight are converted into more valuable hydrocarbons of higher molecular weight. The invention is especially concerned with the preparation of lubricating oil of high viscosity index from composite hydrocarbon material of lower molecular weight having poorer viscosity-temperature relationship.

The invention provides a process for converting a composite hydrocarbon charge which may be gas oil or lubricating oil into lubricating oil of greater molecular weight and higher viscosity than the original charge. In accordance with the invention, the charge material is caused to react with a relatively high molecular weight aliphatic alcohol in the presence of a catalyst of the water-absorbing type, whereby water is split off from the reactants and the aliphatic radical from the alcohol is attached as a side chain to a hydrocarbon of the charge. This results in a product of higher paraffinicity than the charge, which accordingly has a better viscosity-temperature relationship.

The process of the present invention is illustrated in the accompanying drawing in simple diagrammatic form. As shown in the drawing, charge oil is passed to a mixing or treating zone along with an aliphatic alcohol and a catalyst. The charge oil is preferably a distillate fraction and may be any desired fraction above about 400° F., such as any gas oil or lubricating oil fraction, dependent on the particular product viscosity desired. The alcohol may be any desired aliphatic alcohol having at least eight carbon atoms in the molecule and preferentially is a branched chain alcohol having at least ten carbon atoms per molecule. Mixtures of alcohols also may be used. It is preferred that the charge oil and alcohol be fed to the process in approximately molar proportions, although larger or smaller amounts of alcohol may be used if desired. An amount of alcohol in excess of the molar proportion permits a greater degree of alkylation but usually is not necessary for obtaining a product of high viscosity index. On the other hand, the use of alcohol in amount substantially less than the molar proportion may limit the degree of alkylation to such extent that the alkylated product will have undesirably low viscosity index.

In the treating zone the reactants and catalyst are intimately mixed until no further amount of water is formed, thus indicating completion of the alkylation reaction, the time required depending on the degree of mixing and the temperature employed in the treatment. Ordinary room temperatures such as 60–90° F. are suitable for carrying out the reaction although higher or lower temperatures also may be used successfully. Sufficient pressure is maintained in the treating zone to prevent vaporization of the catalyst at the temperature employed.

From the treating zone the reaction mixture is passed to a settling zone wherein oil-insoluble constituents comprising catalyst, water, alcohol not consumed in the reaction and any sludge which may have formed, are separated from the refined hydrocarbons. The oil-insoluble material is separately withdrawn from the settling zone and may be subjected to treatment for recovery of the catalyst and alcohol. The refined hydrocarbon layer is then subjected to alkali treatment, for example with aqueous caustic soda, to neutralize any retained catalyst, after which it is washed and finally dried to yield the desired lubricating oil product.

In practicing the above described process, it is distinctly preferable to utilize as charge to the process and oil fraction of low aromatic content, for example a fraction containing less than about 10 per cent and preferably not more than about 5 per cent aromatic constituents. I have found that aromatics when present in higher concentration cause the formation of sludge or tar during the alkylation reaction, which makes the subsequent separation of oil-insoluble materials from the reaction mixture exceedingly difficult, whereas such difficulties are avoided if the aromatic content of the charge is sufficiently low. A charge oil of suitably low aromatic content may be prepared by solvent extraction, sulfuric acid treatment, selective adsorption by means of granular adsorbents, or in any other desired manner.

As stated above, the catalyst utilized in the process is of the water-absorbing type. A preferred catalyst is hydrofluoric acid in anhydrous or concentrated form. Other catalysts of the aforesaid type are phosphoric acid, sulfuric acid, aluminum chloride and boron fluoride.

The following examples are illustrative and serve to show how the invention may be carried out in actual practice:

Example I

A gas oil derived from a naphthenic base crude was solvent-extracted to reduce the aromatic content. One hundred parts by weight of the solvent-extracted oil was treated with 134 parts of a branched chain heptadecanol, specifically 3,9-diethyl-6-tridecanol, in the presence of 157 parts anhydrous hydrogen fluoride. The treating temperature was approximately 75° F. and the reaction mixture was maintained under sufficient pressure to keep the hydrogen fluoride in liquid phase. After 14 hours of treatment during which continuous mixing was effected, the reaction mixture was permitted to stratify. The oil-insoluble materials were withdrawn and the refined hydrocarbon layer was neutralized with caustic soda, washed and dried, thereby yielding 191 parts of alkylated product. The following tabulation shows properties of the solvent extracted gas oil and of the alkylated product:

|  | Solvent Extracted Gas Oil | Alkylated Product |
|---|---|---|
| A. P. I. gravity | 37.9 | 40.5 |
| Density, $\frac{20°C.}{4°C.}$ | 0.8318 | 0.8188 |
| S. U. viscosity at 100° F | 33 | 200 |
| Viscosity index | 85 | 120 |
| Viscosity-gravity constant | 0.835 | 0.748 |
| Molecular weight [3] | 191 | 360 |
| Refractive index, $\frac{20°C.}{D}$ | 1.4611 | 1.4552 |
| G. & D. specific dispersion×10[4] | 104 | 102 |
| Composition: |  |  |
| Vol. per cent aromatics | 5 | 0 |
| Vol. per cent olefins | 4 | 0 |
| Vol. per cent naphthenes | 37 | [1] 11 |
| Vol. per cent paraffins | 54 | [2] 89 |
| Avg. no. of chain=$CH_2$ groups per molecule | 8 | 22 |

[1] Weight per cent naphthene rings.
[2] Weight per cent paraffinic chains.
[3] Determined by freezing point method in benzene solution.

In the present example there was substantially no sludge or tar formed during the alkylation treatment, and the subsequent separation of the reaction mixture was easily accomplished. When the original unextracted gas oil, which had an aromatic content of 17 per cent by volume, was treated under substantially the same conditions as set forth above, a dark-colored sludge or tar was formed which rendered the separation of the reaction mixture exceedingly difficult.

*Example II*

One hundred parts by weight of a solvent extracted lubricating oil fraction derived from a mixture of Gulf coastal crudes was reacted with 65 parts of a branched chain tetradecanol, specifically 2-methyl-7-ethyl-4-undecanol, in the presence of 91 parts of anhydrous hydrogen fluoride and under conditions similar to those used in Example I. After a reaction time of 9½ hours, the reaction mixture was allowed to stratify, the oil-insoluble materials were withdrawn and the refined hydrocarbons were neutralized, washed and dried. One hundred seventeen parts of alkylated product were obtained, the properties of which along with those of the charge are given in the following tabulation:

|  | Solvent Extracted Lubricating Oil | Alkylated Product |
|---|---|---|
| A. P. I. gravity | 25.3 | 32.0 |
| Density, $\frac{20°C.}{4°C.}$ | 0.8986 | 0.8621 |
| S. U. viscosity at 100° F | 207 | 290 |
| Viscosity index | 66 | 112 |
| Viscosity-gravity constant | 0.852 | 0.800 |
| Molecular weight [1] | 333 | 375 |
| Refractive index, $\frac{20°C.}{D}$ | 1.4907 | 1.4778 |
| G. & D. specific dispersion×10[4] | 106 | 102 |
| Composition: |  |  |
| Wt. per cent aromatic rings | 4 | 0 |
| Wt. per cent olefins | 0 | 0 |
| Wt. per cent naphthenic rings | 45 | 20 |
| Wt. per cent paraffin chains | 51 | 80 |
| Avg. no. of chain=$CH_2$ groups per molecule | 11 | 20 |

[1] Determined by freezing point method in benzene solution.

In place of aliphatic alcohols, their corresponding esters, chlorides and sulfates may be used in alkylating gas oil or lubricating oil, although none of these agents is as satisfactory as the alcohols themselves.

What I claim and desire to protect by Letters Patent is:

1. The method of alkylating hydrocarbons which comprises reacting a hydrocarbon charge boiling above about 400° F. containing a substantial proportion of naphthenic constituents and containing less than about 10 percent aromatics with at least a substantially equimolar quantity of an aliphatic alcohol containing at least 8 carbon atoms per molecule under alkylating conditions and in the presence of a catalyst of the water-absorbing type.

2. The method of alkylating hydrocarbons which comprises reacting a hydrocarbon charge containing a substantial proportion of naphthenic constituents and containing less than about 10 per cent aromatics with at least a substantially equimolar quantity of an aliphatic alcohol containing at least 8 carbon atoms per molecule under alkylating conditions in the presence of a catalyst of the water-absorbing type.

3. The method defined in claim 1 wherein the catalyst is hydrogen fluoride.

4. The method defined in claim 1 wherein the alcohol is a branched chain alcohol containing at least 10 carbon atoms.

5. The method defined in claim 2 wherein the catalyst is hydrogen fluoride.

6. The method defined in claim 2 wherein the alcohol is a branched chain alcohol containing at least 10 carbon atoms.

7. The method of alkylating hydrocarbons which comprises treating a hydrocarbon charge boiling above about 400° F. containing a substantial proportion of naphthenic constituents to reduce the aromatic content thereof so that it contains not more than 10% aromatics and then reacting said treated hydrocarbon with at least a substantially equimolar quantity of an aliphatic alcohol containing at least 8 carbon atoms per molecule under alkylating conditions in the presence of a catalyst of the water absorbing type.

RICHARD S. VOSE.

REFERENCES CITED

The following references are of record in the file of this patent:

UNITED STATES PATENTS

| Number | Name | Date |
|---|---|---|
| 2,346,452 | Pevere et al. | Apr. 11, 1944 |
| 2,324,357 | Bruun et al. | July 13, 1943 |
| 2,335,704 | Smith | Nov. 30, 1943 |
| 2,365,426 | Molique | Dec. 19, 1944 |
| 2,345,802 | Frey | Apr. 4, 1944 |
| 2,383,056 | Goldsby | Aug. 21, 1945 |
| 2,354,652 | Carmody et al. | Aug. 1, 1944 |